June 27, 1950  F. M. FIKE  2,513,015
SELF-ADJUSTING HYDRAULIC BRAKE ACTUATOR
Filed Jan. 21, 1947  2 Sheets-Sheet 1
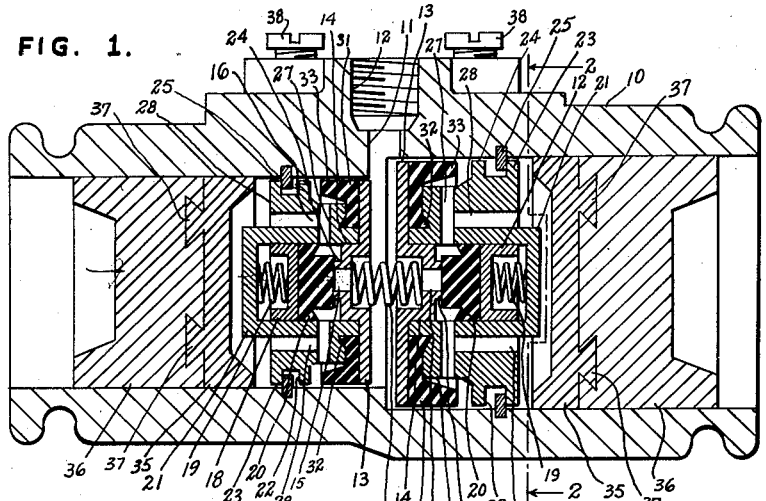
FIG. 1.
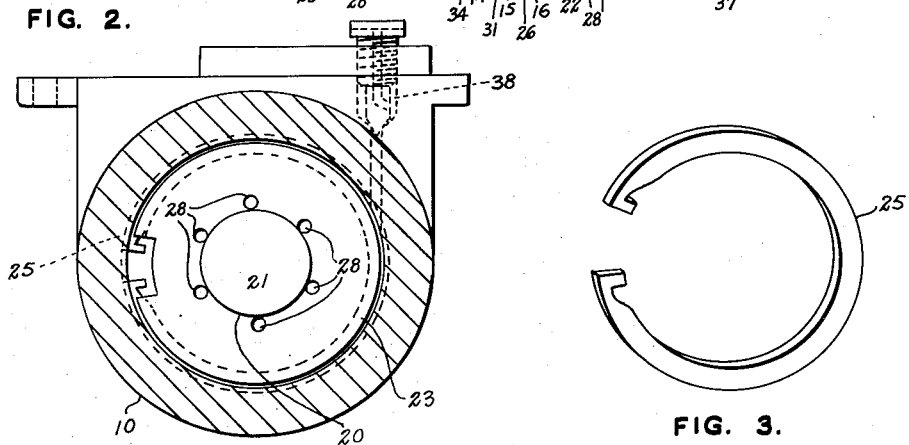
FIG. 2.
FIG. 3.
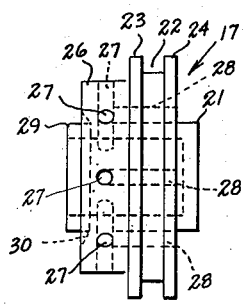
FIG. 4.
Inventor
FLOYD M. FIKE,
By McMorrow, Berman & Davidson
Attorneys June 27, 1950 F. M. FIKE 2,513,015
SELF-ADJUSTING HYDRAULIC BRAKE ACTUATOR
Filed Jan. 21, 1947 2 Sheets-Sheet 2
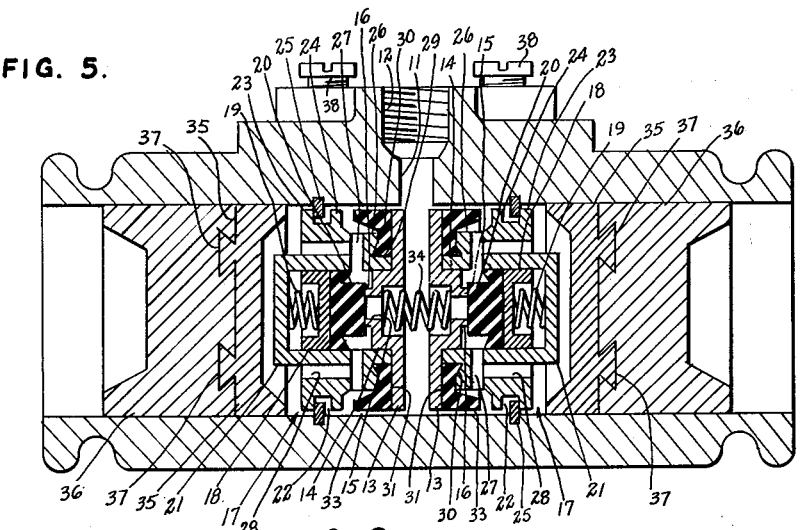
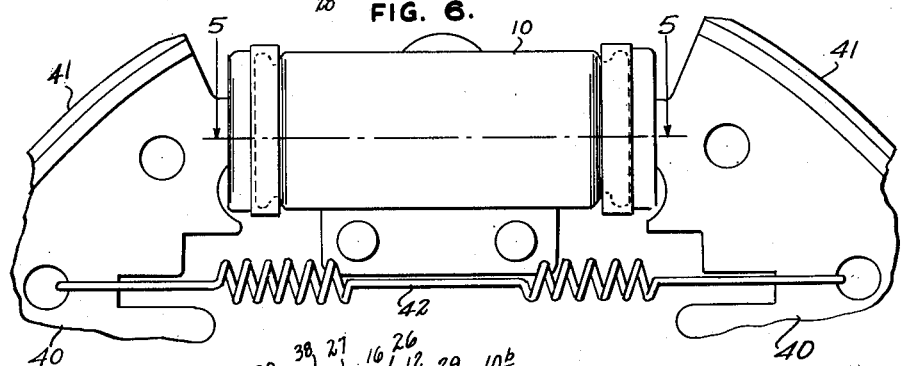
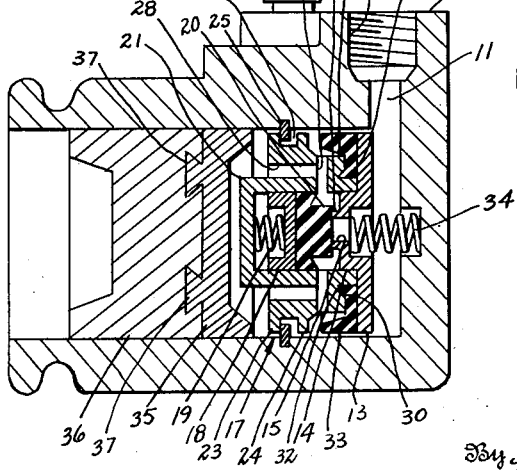
INVENTOR
FLOYD M. FIKE, Patented June 27, 1950

2,513,015

UNITED STATES PATENT OFFICE 2,513,015

SELF-ADJUSTING HYDRAULIC BRAKE ACTUATOR

Floyd M. Fike, Flagstaff, Ariz.

Application January 21, 1947, Serial No. 723,324

6 Claims. (Cl. 60—54.6)

My invention relates to improvements in hydraulic brakes for automobiles, trucks and the like, and more particularly to self-adjusting brake actuators.

The object of my invention is to provide a self-adjusting hydraulic brake actuator which is self-adjusting and adapted to maintain automatically a predetermined clearance between the brake shoes and the drum regardless of wear or expansions and contractions of the brake drum caused by heat variations.

Another object of my invention is to provide a hydraulic brake actuator having means for trapping a predetermined amount of liquid to serve as a stop to release movement of the brake actuator, said means being automatically adjustable to determine the volume of the liquid so trapped to define the desired release clearance.

A further object of my invention is to provide a self-adjusting hydraulic brake actuator having a new and improved means for adjusting the brake release clearance, affording an extensive wear range limited only by the maximum extent of movement of the brake cylinder piston and adapted to effect minutely graduated adjustments to compensate for wear or drum expansions caused by heat created by continuous use of the brakes.

A still further object of my invention is to provide a hydraulic brake actuator equipped with means for releasing excessive pressure which might cause an over-adjustment due to drum contractions following drum expansions caused by heat.

A still further object of my invention is to provide a hydraulic brake actuator requiring no more space than the actuators used heretofore, and such that it can be installed in existing automobile and truck brake cylinders as well as in those designed for its use.

Another object of my invention is to provide a hydraulic brake actuator adapted to be used on cars, trucks, airplanes, tractors, or any other moving vehicle equipped with hydraulic brake means.

Other objects of my invention may appear in the following specification describing my invention with reference to the accompanying drawings illustrating a preferred embodiment of my invention.

It is, however, to be understood that my invention is not limited or restricted to the exact construction and combination of parts described in the specification and shown in the drawings, but that such changes and modifications may be made which fall within the scope of the claims appended hereto.

In the drawings:

Figure 1 is a longitudinal sectional view taken on the vertical longitudinal center plane of a hydraulic brake actuator according to my invention.

Figure 2 is a transverse sectional view taken on line 2—2 of Figure 1.

Figure 3 is a perspective view of a stop ring used in connection with my invention.

Figure 4 is a side elevational view of a valve body.

Figure 5 is a longitudinal sectional view of a modified form of the brake actuator, the view being taken on line 5—5 of Figure 6.

Figure 6 is a fragmentary elevational view of a brake equipped with a brake actuator according to my invention.

Figure 7 is a longitudinal sectional view of another modified form of the brake actuator according to my invention.

Referring now in detail to the drawings, the hydraulic brake actuator forming the subject matter of my invention comprises a stepped bore cylinder 10. The cylinder can, however, be a straight bore cylinder, as shown in Figure 5, or it can be of the closed-end type, as shown in Figure 7, it being understood that a closed-end cylinder operates only one brake shoe, while a double-end cylinder operates two brake shoes.

As shown in Figure 1, the circumferential wall of the cylinder 10 has intermediate the ends of said cylinder a diametrically extending hole or port 11 having a tapped counterbore 12 to which a brake (not shown) is adapted to be connected.

Although the stepped cylinder ends are of different internal diameter, the arrangement of the parts in the two cylinder ends is symmetrical about the diametrical center plane of the cylinder.

Each cylinder end has therein at the axially inward end thereof and at the corresponding side of said diametrical plane a retainer disk 13 having an outside diameter smaller than the inside diameter of the related cylinder end. Each retainer disk 13 has a central axially outwardly extending hollow boss 14 provided with an axial round hole 15 surrounded by an axially outwardly extending valve seat 16.

Positioned in each cylinder end axially outwardly of its retainer disk 13 is a cylindrical valve body 17. Within an axial cylindrical opening in the valve body closed at its outward end, is a slidable cup-shaped release piston 18 pressed in an axially inward direction by a valve body release spring 19 located between the piston 18 and the closed end of the valve body opening. A rubber cup valve 20 which abuts the closed axially inward end of the cup piston 18 is slidable in the cylindrical opening of the valve body 17 and is arranged to be pressed against the valve seat 16 by the piston 18 and its spring 19 so as to close the round hole 15 in the retainer disk 13.

On the axially outward end of the valve body 17 is a short cylindrical portion 21 substantially smaller in diameter than the valve body 17. The diameter of the valve body 17 is slightly smaller than that of the inside diameter of the related end of the wheel cylinder 10, and the periphery of the valve body 17 is formed with a circumferential groove 22 which defines inner and outer flanges 23 and 24, respectively.

A metal snap ring 25, secured in a circumferential groove cut in the bore of the cylinder 10 is arranged so that it is located between the two stop flanges 23 and 24, whereby axial movement of the valve body 17 in the cylinder bore is limited to the difference between the thickness of the snap ring 25 and the width of the groove 22 between the stop flanges 23 and 24.

A portion 26 at the axially inward end of the valve body inwardly of the inner stop flange 24 is smaller in diameter than the bottom of the circumferential groove 22, and the portion 26 is traversed by a plurality of circumferentially spaced radial holes 27, which communicate intermediate their ends with longitudinally extending holes 28 formed parallel to the axis of the body 17 and surrounding the short axially outwardly projecting portion 26 and opening through the axially outward end of the body 17.

An axially inwardly projecting annular flange 29 on the valve body portion 26 is registered with the axial cylindrical opening in the valve body 17 and an annular outwardly tapered groove 30 surrounds the flange 29. A rubber retaining cup 31 is provided with a center hole surrounded by an inwardly bevelled lip 32 fitting in the groove 30 with the flange 29 of the valve body 17 in the center hole of the retaining cup. The outside diameter of the retaining cup 31 is the same as that of the retainer disk 13 and the circumferential lip 33 of the retaining cup extends in an axially outward direction.

The hollow boss 14 of the retainer ring 13 is pressed into the axially inward end of the cylindrical opening of the valve body 17 so that the axially inward end of the valve body flange 29 abuts the retainer ring 13 and the retaining ring engages the body of the rubber retainer cup 31 within its lip 33.

A main helical spring 34 is compressed between the two retainer rings 13 with the opposite ends of the spring positioned in the hollow bosses 14.

Slightly spaced outwardly from the axially outward end portion 21 of the valve body 17 is a piston cup 35 dovetailed to the inward end of a wheel cylinder piston 36, as indicated at 37.

On one side the wheel cylinder 10 is provided with a bleeder valve construction 38 communicating with the interior of the cylinder for a purpose to be described hereinafter.

When upon application of the brakes, brake fluid under pressure enters the cylinder 10 through the port 11, it flows into the space between the retainer rings 13 and into the holes 15 in the bosses 14, where it is stopped by the cup valves 20. If the pressure is sufficiently high the rubber cup valves 20 are forced outwardly away from their seats 16 against the resistance of the springs 19, so that the fluid can then flow through the holes 27 into the annular space surrounding the valve body, thereby expanding the lips 33 of the cups 31 tightly in the cylinder ends, and through the valve body holes 28, so as to act against the inward ends of the pistons 35, 36 and force them outwardly to press the brake shoes 40 into engagement with the brake drum 41, thereby stretching the brake shoe retracting spring 42. Some of the fluid under pressure passes around the rubber retainer cups 31.

The axially outward pressure exerted by the main spring 34 in opposite directions added to the fluid entering the cylinder 10 and acting against the inner stop ring 24 and adjacent portions of the inward end of the valve bodies moves the valve bodies in axially outward directions, until the inner stop ring 24 engages the snap ring 25. This limitation of outward movement of the valve bodies 17 determines the brake shoe to drum clearance. The bleeder valve 38 enables venting of air from the cylinder when the brake system is serviced or is being filled with fluid.

When the brakes are released after being applied, the fluid pressure on the inward faces of the retainer rings 13 subsides to a point at which the valve release springs 19 can return the rubber cup valves 20 into engagement with their seats 16. This traps brake fluid in the cylinder ends between the piston cups 35 and the valve bodies 17, so that the spacing of the valve bodies and the related piston cups which obtain upon application of the brakes is maintained in the released condition of the brakes until a subsequent application of the brakes, and the brake shoe retracting spring 42 is thereby prevented from retracting the brake shoes 40, and hence the pistons 36, beyond that amount providing desired clearance between the brake shoes and the drum.

The above described arrangement of the actuator is such that in the event that the brake drum 41 contracts due to cooling thereof from a hot expanded condition, wherein clearance between the drum and shoes is eliminated, the actuator automatically adjusts itself to re-establish a proper clearance. This adjustment takes place upon application of the brakes in the absence of clearance between the drum and the shoes. As the brakes are so applied, with consequent increase in pressure of the brake fluid in the inlet passage or hole 11, the valve body 17 being unable to move outwardly because of the fluid trapped between said valve body and the piston cup 35 and the piston 36 being unable to move outwardly, the increased pressure overcomes the release springs 19 and moves the rubber valve cups 20 from their seats 16. This opens the holes 15 and permits the fluid trapped between the valve bodies 17 and the piston cups 35 to escape through the passages 28 and said hole 15 and free the valve bodies 17 to be moved outwardly by the main spring 34 until the inner stop flange 24 abuts the snap ring 25.

Upon release of the brakes after the above described actions the pressure in the inlet port 11 subsides so that the rubber cup valves 20 are reseated against the valve seats 16 by the release springs 19, whereby the fluid present between the valve bodies 17 and the piston cups 35 is trapped again.

As the brakes become fully released, the pressure in the inlet port 11 is fully relaxed so that the brake shoe return spring 42 can overcome the main spring 34 and cause the valve bodies 17 to move inwardly until their outer stop flanges 23 abut the snap ring 25, whereby the brake shoes 40 are retracted from the brake drum 41, whereby a clearance therebetween equal to the distance between the snap ring 25 and the outer stop flange 23 is provided.

In Figure 5, a modified form of the brake actuator is shown. The entire construction of the working parts is exactly as described above, the only difference being that the cylinder 10a of this modified form is a straight or uniform bore cylinder instead of a cylinder of the stepped bore type.

In Figure 7, another modified form of brake actuator according to my invention is shown. In this form the cylinder 10b is of the closed-end type, and only one floating valve body 17 is used and only one brake shoe is operated, so that the entire construction and combination of parts in the modified form is like the construction of one-half of a double-acting brake actuator as described above.

Having described my invention, I claim as new and desire to secure by Letters Patent:

1. A hydraulic brake actuator, a wheel cylinder comprising a valve body including a piston cup and a piston arranged to be moved axially in said cylinder, said piston cup and piston being connected together to move as a unit, the exterior of said valve body being formed with a circumferential groove defining outward and inward stop flanges, the interior of said cylinder being formed with a circumferential groove, a snap ring positioned in said interior groove and projecting into the external groove of said valve body, said snap ring being narrower than the space between said stop flanges to permit limited axial movement of said valve body in said cylinder.

2. A hydraulic brake actuator for a wheel cylinder comprising a valve body comprising a piston cup and a piston adapted to be moved axially in said cylinder, said piston cup and said piston being connected together to move as a unit, said valve body being provided with a circumferential groove defining outward and inward stop flanges, a snap ring arranged in an inner circumferential groove in said cylinder and extending into the circumferential groove into the valve body between said stop flanges to limit the axial movement of said valve body, said valve body having a cylindrical bore therein closed at its axially outward end, said cup piston being slidably arranged in said bore, a helical spring compressed between the closed end of said bore and said cup piston, a rubber cup valve slidably mounted in said bore and abutting said cup piston, a retainer ring, a perforated hollow boss centrally formed on said ring and secured in the axially inward end of said bore in the valve body, and a main helical spring engaging said retainer ring in a manner to urge said valve body in an axially outward direction.

3. A hydraulic brake actuator for a wheel cylinder comprising a valve body comprising a piston cup and a piston adapted to be moved axially in said cylinder, said piston cup and said piston being connected together to move as a unit, the said valve body being provided with a circumferential groove defining outward and inward stop flanges, a snap ring arranged in an inner circumferential groove in said cylinder and extending into the circumferential groove in the valve body between said stop flanges to limit the axial movement of said valve body, said valve body having a cylindrical bore therein closed at its axially outward end, said cup piston being slidably arranged in said bore, a helical spring compressed between the closed end of said bore and said cup piston, a rubber cup valve slidably mounted in said bore and abutting said cup piston, a retainer ring, a perforated hollow boss centrally formed on said ring and secured in the axially inward end of said bore in the valve body, a main helical spring engaging said retainer ring in a manner to urge said valve body in an axially outward direction, a valve seat formed on said hollow boss, the first named helical spring urging said rubber cup valve into engagement with said seat, said valve body being traversed by a plurality of longitudinally extending and radially extending holes, said holes communicating with each other, and a rubber retainer cup on said retainer ring, the radially outward ends of said radial holes being located adjacent to said retainer cup.

4. A hydraulic brake actuator for a wheel cylinder comprising a valve body comprising a piston cup and a piston adapted to be moved axially in said cylinder, said piston cup and said piston being connected together to move as a unit, the said valve body being provided with a circumferential groove defining outward and inward stop flanges, a snap ring arranged in an inner circumferential groove in said cylinder and extending into the circumferential groove in the valve body between said stop flanges to limit the axial movement of said valve body, said valve body having a cylindrical bore therein closed at its axially outward end, said cup piston being slidably arranged in said bore, a helical spring compressed between the closed end of said bore and said cup piston, a rubber cup valve slidably mounted in said bore and abutting said cup piston, a retainer ring, a perforated hollow boss centrally formed on said ring and secured in the axially inward end of said bore in the valve body, a main helical spring engaging said retainer ring in a manner to urge said valve body in an axially outward direction, a valve seat formed on said hollow boss, the first named helical spring urging said rubber cup valve into engagement with said seat, said valve body being traversed by a plurality of longitudinally extending and radially extending holes, said holes communicating with each other, a rubber retainer cup on said retainer ring, the radially outward ends of said radial holes being located adjacent to the retainer cup, and a bleeder valve traversing the wall of said cylinder and communicating with the interior of said cylinder adjacent to said inward stop flange on said valve body.

5. A self-adjusting brake actuator comprising a wheel cylinder having a pressure brake fluid inlet port, spaced from one end of said cylinder, a brake shoe operating piston in said one end of said cylinder, a centrally apertured retainer disk located in said cylinder between said inlet port and said piston and spaced axially inwardly from said piston, said retainer disk having a valve seat communicating with the central aperture of said retainer disk, a valve body positioned for axial movement in said cylinder between said retainer disk and said piston and upon which said retainer disk is mounted, said valve body being formed with a longitudinal bore aligned with said valve seat and closed at its axially outward end, axially inwardly spring pressed valve means in said bore normally engaging and closing said valve seat, said valve body having a pair of axially spaced peripheral flanges slidably fitting the interior of said cylinder, a projection on the interior of said cylinder projecting into the space between and being narrower than the space between said flanges whereby said valve body is confined to limited axially outward and inward movements, said valve body being formed with longitudinal passage means opening at the radially outward end thereof between said valve body and said piston, said valve body further being formed with radial passage means communicating with the axially inward ends of said longitudinal passage means, said radial passage means opening at the radially outward end thereof into a space existing between said retainer disk and said axially inward stop flange and defined by a reduced inward portion on said valve body, and a main spring operatively engaging the axially inward side of said retainer disk and urging said valve body in an axially outward direction.

6. A self-adjusting brake actuator comprising a wheel cylinder having a pressure brake fluid inlet port, spaced from one end of said cylinder, a brake shoe operating piston in said one end of said cylinder, a centrally apertured retainer disk located in said cylinder between said inlet port and said piston and spaced axially inwardly from said piston, said retainer disk having a valve seat communicating with the central aperture of said retainer disk, a valve body positioned for axial movement in said cylinder between said retainer disk and said piston and upon which said retainer disk is mounted, said valve body being formed with a longitudinal bore aligned with said valve seat and closed at its axially outward end, axially inwardly spring pressed valve means in said bore normally engaging and closing said valve seat, said valve body having a pair of axially spaced peripheral flanges slidably fitting the interior of said cylinder, a projection on the interior of said cylinder projecting into the space between and being narrower than the space between said flanges whereby said valve body is confined to limited axially outward and inward movements, said valve body being formed with longitudinal passage means opening at the radially outward end thereof between said valve body and said piston, said valve body further being formed with radial passage means communicating with the axially inward ends of said longitudinal passage means, said radial passage means opening at the radially outward end thereof into a space existing between said retainer disk and said axially inward stop flange and defined by a reduced inward portion on said valve body, and a main spring operatively engaging the axially inward side of said retainer disk and urging said valve body in an axially outward direction, said longitudinal and radial passage means being arranged to pass fluid into the space between said retainer disk and said axially inward stop flange when sufficient fluid pressure is exerted through said inlet port and the central aperture of said retainer plate to augment the pressure of said main spring to unseat said spring pressed valve means from said seat, whereby said brake shoe operating piston is moved in said cylinder in an axially outward direction, relaxation of said pressure permitting said spring pressed valve means to return to and close said valve seat so as to trap fluid present in the space between said piston and said valve body and in the space between said retainer disk and said axially inward stop flange and thereby prevent axially inward displacement of said valve body and axially inward displacement of said piston.

FLOYD M. FIKE.

REFERENCES CITED

The following references are of record in the file of this patent:

UNITED STATES PATENTS

| Number | Name | Date |
|---|---|---|
| 697,140 | Goldschmidt | Apr. 8, 1902 |
| 2,156,120 | La Brie | Apr. 25, 1939 |
| 2,189,134 | Chard | Feb. 6, 1940 |

FOREIGN PATENTS

| Number | Country | Date |
|---|---|---|
| 374,150 | Great Britain | June 6, 1932 |